United States Patent [19]

Ohishi

[11] Patent Number: 5,458,217

[45] Date of Patent: Oct. 17, 1995

[54] ELECTRORHEOLOGICAL FLUID DAMPING CONTROL SYSTEM HAVING HIGH VOLTAGE POWER SUPPLY

[75] Inventor: Masatoshi Ohishi, Tokyo, Japan

[73] Assignee: Bridgestone Corporation, Tokyo, Japan

[21] Appl. No.: 317,825

[22] Filed: Oct. 4, 1994

Related U.S. Application Data

[63] Continuation-in-part of Ser. No. 161,866, Dec. 6, 1993, abandoned, which is a continuation of Ser. No. 872,994, Apr. 24, 1992, abandoned.

[30] Foreign Application Priority Data

May 1, 1991 [JP] Japan ..................................... 3-100025

[51] Int. Cl.⁶ .................................................. F16F 15/03
[52] U.S. Cl. ......................... 188/267; 188/299; 280/707; 363/61; 363/63
[58] Field of Search ................................. 320/1; 363/61, 363/68; 267/140.13; 188/267, 276, 279, 299; 280/707, 714

[56] References Cited

U.S. PATENT DOCUMENTS

| | | |
|---|---|---|
| 3,058,252 | 10/1962 | Matusche . |
| 3,363,165 | 1/1968 | Wilkinson ................................. 363/68 |
| 3,369,149 | 2/1968 | Grant ........................................ 363/61 |
| 3,541,424 | 11/1970 | Tada et al. .................................. 363/68 |
| 3,764,886 | 10/1973 | Zarowin ..................................... 363/61 |
| 3,986,085 | 10/1976 | Weber ....................................... 363/61 |
| 4,616,300 | 10/1986 | Santelmann, Jr. . |
| 4,890,210 | 12/1989 | Myers . |
| 5,060,919 | 10/1991 | Takano et al. . |

FOREIGN PATENT DOCUMENTS

| | | | |
|---|---|---|---|
| 0325454 | 7/1989 | European Pat. Off. . | |
| 656163 | 4/1979 | U.S.S.R. ................................. | 363/61 |

OTHER PUBLICATIONS

V. M. Vakulenko and L. P. Ivanov, "Voltage–Doubler Charging Circuit for a Storage Capacitor," *Instruments and Experimental Techniques*, Sep. 1970, pp. 1371–1373.

*Primary Examiner*—Robert J. Oberleitner
*Assistant Examiner*—Lee W. Young
*Attorney, Agent, or Firm*—Oliff & Berridge

[57] ABSTRACT

Disclosed herein is an electrorheological fluid damping control system. The suspension control system is comprised of a transformer and a rectifier circuit, which is electrically connected to a secondary winding of the transformer and is provided with capacitors. A capacitive load is electrically connected to output terminals of the rectifier circuit. When voltage to be applied across the capacitive load is cut off, electric charges stored in the capacitors and in a capacitive component of the capacitive load are discharged through a resistive component of the capacitive load. The capacitance of each capacitor is determined such that a discharge time constant of a circuit comprised of tile capacitors and the capacitive load is a predetermined value or less.

20 Claims, 7 Drawing Sheets

ELECTRORHEOLOGICAL FLUID DAMPING CONTROL SYSTEM HAVING HIGH VOLTAGE POWER SUPPLY

This is a continuation-in-part application of U.S. patent application Ser. No. 08/161,866 filed Dec. 6, 1993, now abandoned, which is a continuation of 07/872,994, filed Apr. 29, 1992, now abandoned.

BACKGROUND OF THE INVENTION

1. Field of the Invention

The present invention relates to a power supply circuit, and more particularly to an electrotheological fluid damping control system which is comprised of a vibration damping apparatus and a high voltage power supply circuit which is electrically connected to a capacitive load of an electrode section of the vibration damping apparatus or an electrode of a power transmission apparatus using electrorheological fluid so as to apply a desired voltage to the capacitive load, and which is used to cut off the voltage applied to the capacitive load and to vary, continuously or in steps, the voltage applied to the capacitive load, to produce high-speed response of the power supply circuit when the supply of the voltage to the capacitive load is cut off.

2. Description of the Related Art

There has heretofore been known electrorheological fluid type applied equipment, such as a vibration damping apparatus or a power transmission apparatus, of a type wherein the electrorheological fluid is interposed between electrodes and the viscosity of the electrorheological fluid to which a desired voltage is applied is used. A power supply circuit comprising a transformer and a rectifier circuit, which is electrically connected to the secondary winding of the transformer and provided with capacitors, is a power supply circuit suitable for use with this type of equipment. It is found that the response (a time interval from the time at which a desired voltage is applied to the time at which the orientation of molecules is completed and the viscosity of the molecules becomes constant) of the electrorheological fluid is several msecs. In order to make the most use of this response characteristic, it is necessary to set the response of the power supply circuit to high-speed response of a few msecs or less, preferably 500 μ sec or less. The power supply circuit should take into consideration the response at the time of application of a desired voltage to a load, i.e., a period from the time at which the primary side of the power supply circuit starts to supply power to the time at which the voltage on the secondary side of the power supply circuit fully increases to a voltage near a set voltage (i.e., increases to 90% of the set voltage). The power supply circuit should also take into consideration the response at the time of a voltage cut-off, i.e., a period from the time at which the primary side of the power supply circuit stops supplying power to the time at which the voltage on the secondary side of the power supply circuit sufficiently drops (i.e., decreases to 10% of the set voltage).

As a method of improving the response of the conventional power supply circuit, there is known one of increasing the ability to supply power from the primary side of the power supply circuit to improve the response of the power supply circuit at the time of the voltage application. The response of the power supply circuit may be several times the oscillating cycle or period. Thus, a sufficient response of the power supply circuit can be expected even if a generally-used oscillating frequency (oscillating period: 50 μ sec) of 20 KHz is used.

On the other hand, as methods of improving the response of the power supply circuit at the time of the voltage cut-off, there have been known a method of mounting a dummy load or resistor for discharging electric charges stored in capacitors of a rectifier circuit on the output terminal of the rectifier circuit, a method of reducing the capacitance of all of the capacitors in a rectifier circuit, a method of reducing the discharge time constant, and a method of increasing the magnitude of an alternating current oscillating frequency which is input to the primary winding of a transformer and reducing the absolute time constant while the same discharge time constant is being set to each oscillating period.

The method using the dummy resistor has a drawback in that since power is consumed by the dummy resistor, the entire operational efficiency is reduced and the quantity of heat generated increases. According to the method of reducing the capacitance of each capacitor, ripple on the output from the rectifier circuit increases, thus providing unstable output. The method of increasing the magnitude of the frequency of the input voltage has a drawback in that the design of the power supply circuit is difficult and elements to be used are also required to have high-speed response characteristics, thereby raising the manufacturing cost.

SUMMARY OF THE INVENTION

With the foregoing drawbacks in view, it is an object of the present invention to provide an electrorheological fluid damping control system which is comprised of a vibration damping apparatus and a high voltage power supply circuit capable of providing high-speed response (in particular, response at the time of a cut-off of a voltage applied to a capacitive load) at a low cost without impairing the stability of an output voltage.

It is another object of the present invention to provide an electrorheological fluid damping control system having a high voltage power supply circuit capable of providing high-speed response which is operable earlier than a response or time interval of about 1 to 3 msecs of an electrorheological fluid used in the vibration damping apparatus.

According to one aspect of the present invention, there is provided an electrorheological fluid damping control system having a high voltage power supply which is comprised of:

a vibration damping apparatus having an air chamber and first and second flexible fluid chambers, the first and second flexible fluid chambers being communicated with at least one passage provided between the first and second flexible fluid chambers;

a negative electrode and a positive electrode being separately disposed in the vibration damping apparatus through the first and second flexible fluid chambers;

a capacitive load including electrorheological fluid having a capability for changing viscosity thereof between approximately 1 to 3 msecs, and being charged in the first and second flexible fluid chambers and the passage, and the negative electrode and the positive electrode being exposed to the electrorheological fluid;

a transformer having a primary winding connected to an alternating current source, and a secondary winding;

a feedback control circuit for detecting the voltage across the output terminals of the rectifier circuit and for producing a voltage control signal for controlling the alternating current source; and a rectifier circuit electrically connected to the secondary winding of the transformer and having a capacitor electrically connected to the negative electrode and the positive electrode, the capacitor having a characteristic to periodically oscillating under an expression of $$T_{reso} \leq \tfrac{1}{2} T_{ERF}$$

wherein $T_{reso}$ represents a oscillating period of the electric power supply which is in the condition that the electric power supply is electrically connected to the capacitive load, and $T_{ERF}$ represents the time of velocity of changing the viscosity of the electrorheological fluid, and
wherein the capacitive load is connected to output terminals of the rectifier circuit, electric charges stored in the capacitor and in a capacitive component of the capacitive load are discharged through a resistive component of the capacitive load when an application of a voltage to the capacitive load is cut off, and an electrostatic capacitance of the capacitor is determined such that a discharge time constant $\tau$ of a circuit comprising the capacitor and the capacitive load is predetermined, in order to produce high-speed response of the power supply circuit when the supply of the voltage to the capacitive load is cut off, under the formula of $$T_{reso} \leq 2\tau$$

The capacitor has an electrostatic capacitance determined such that a discharge time constant of a circuit comprised of the capacitor and the capacitive load is a predetermined value or less.

The capacitance of the capacitor in the rectifier circuit, i.e., the capacitor contributing to the discharge, storing the electric charges therein which is discharged through the resistive component of the capacitive load together with the electric charges stored in the capacitive component of the capacitive load when the voltage applied to the capacitive load is cut off, are determined such that the discharge time constant of the circuit comprised of the above capacitor and the capacitive load, which is electrically connected to the output terminals of the rectifier circuit, is a predetermined value or less. In the present invention, the electrostatic capacitance of the capacitor in the rectifier circuit, which contribute to the discharge, is determined in view of a characteristic of the capacitive load. Therefore, the necessary discharge time constant can be obtained by reducing the electrostatic capacitance of the capacitor, thereby making it possible to produce high-speed response of the power supply circuit when the supply of the voltage to the capacitive load is cut off. It is also unnecessary to increase the magnitude of the frequency of an applied voltage beyond the needed frequency. Therefore, the power supply circuit is simplified and inexpensive electrical parts can be used. Further, since the capacitance of the capacitor contributing to the discharge is reduced and the capacitances of other capacitors are not reduced more than needed, ripple on the output voltage can be determined such that it has no effect on the capacitive load. Necessary high-speed response can therefore be achieved.

According to the present invention, as described above, the capacitance of the capacitor in the rectifier circuit, which contribute to the discharge, is determined such that the discharge time constant is a predetermined value or less. The present invention can therefore has an advantage in that the high-speed response (in particular, response at the time of the cut-off of the voltage applied to the capacitive load) of the power supply circuit can be produced at low cost without impairing the stability of the output voltage.

DETAILED DESCRIPTION OF THE PREFERRED EMBODIMENTS

Figure 1:
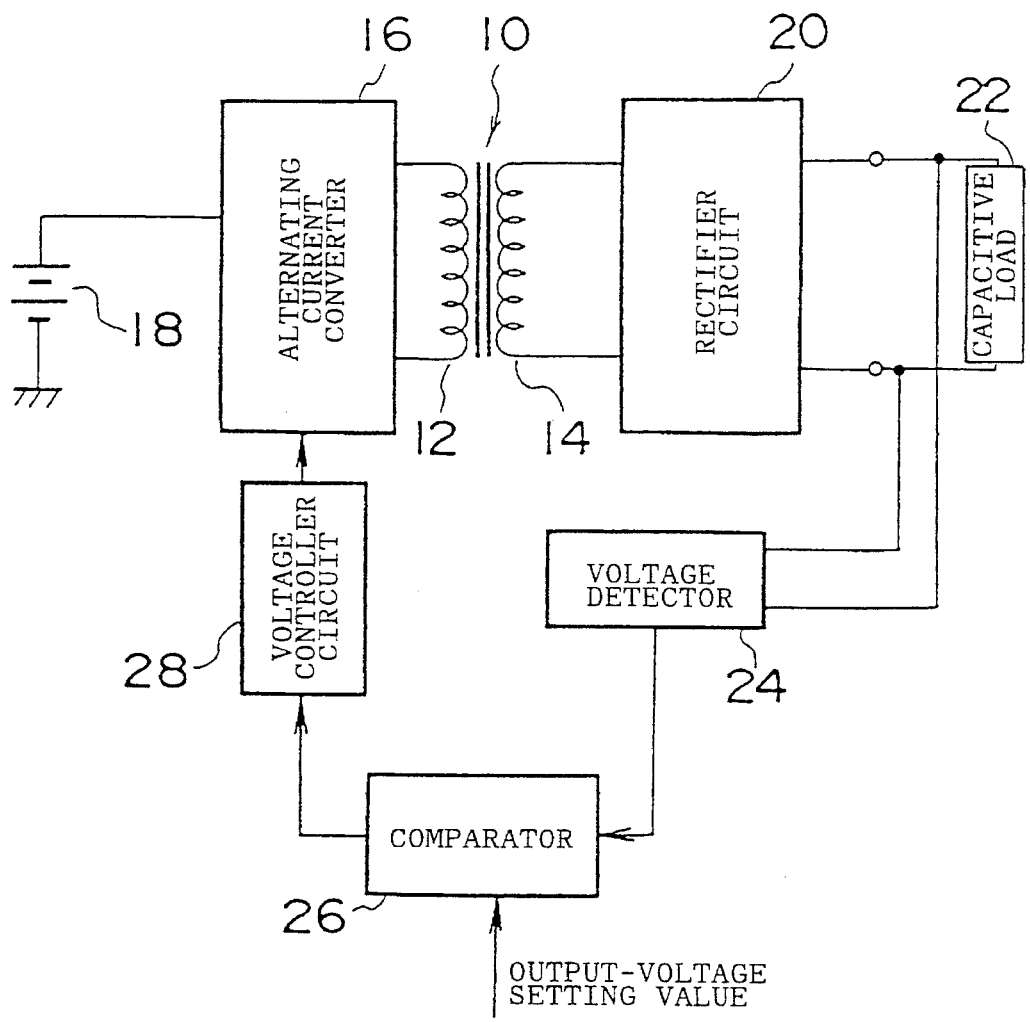
FIG. 1 is a block diagram showing a first embodiment of the present invention.

Preferred embodiments of the present invention will hereinafter be described in detail with reference to the accompanying drawings. FIG. 1 shows a power supply circuit as a first embodiment of the present invention. An alternating current (hereinafter abbreviated as "s.c.") converter 16 comprised of an inverter and the like is electrically connected to the primary winding 12 of a step-up transformer 10. A direct current (hereinafter abbreviated as "d.c.") power supply 18 is electrically connected to the s.c. converter 16. A rectifier circuit 20 is electrically connected to the secondary winding 14 of the step-up transformer 10. A capacitive load 22 is electrically connected to the output terminals of the rectifier circuit 20. In addition, a voltage detector 24 is electrically connected to the output terminals of the rectifier circuit 20. The output terminal of the voltage detector 24 is electrically connected to a comparator 26 to which an output-voltage setting value is to be input. The output terminal of the comparator 26 is electrically connected to the s.c. converter 16 via a voltage controller circuit 28 for controlling the magnitude of the voltage applied where by means of pulse width modulation control.

Figure 2:
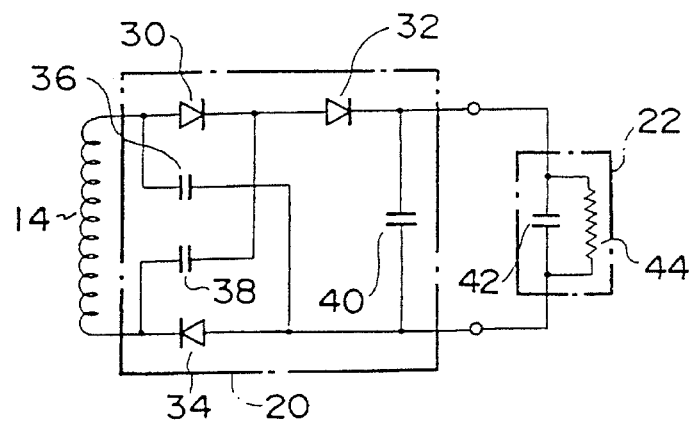
FIG. 2 is a circuit diagram showing a rectifier circuit employed in the first embodiment shown in FIG. 1.

As shown in FIG. 2, the rectifier circuit 20 is comprised of a voltage triplet. The voltage tripler comprises three diodes 30, 32, 34 and three capacitors 36, 38, 40. The capacitive load 22 includes a capacitive component 42 and a resistive component 44. The capacitive load 22 is electrically parallel-connected to the capacitor 40. In addition, the secondary winding 14 is electrically connected between the anode of the diode 30 and the cathode of diode 34.

In the present embodiment, when the a.c. converter 16 supplies alternating current to the primary winding 12, the alternating current is induced in the secondary winding 14. The induced alternating current is rectified by the rectifier circuit 20 and then supplied to the capacitive load 22. The voltage output from the rectifier circuit 20 is subjected to feedback control so as to reach the output-voltage setting value by means of the voltage detector 24, the comparator 26 and the voltage controller circuit 28.

When the application of the voltage to the capacitive load 22 is stopped, electric charges stored in the capacitor 40 and the capacitive component 42 are discharged by the resistive component 44. In the present embodiment, the capacitance C1 of the capacitor 40 is defined such that (C1+C2)R be either equal to or smaller than K, i.e., $(C1+C2)R \leq K$ (where K=constant), in order to produce quick response to the above discharge. In the above expression, C2 represents the capacitance of the capacitive component 42 in the capacitive load 22, R represents the resistance of the resistive component 44, and (C1+C2)R represents a discharge time constant. K is a few msecs or less, preferably less than or equal to 500 μ sec, C2 is 150 PF, and R is about 2M Ω. According to the present embodiment as described above, the capacitance of each capacitor which contributes to the discharge of the rectifier circuit is fixed such that the discharge time constant reaches a predetermined value or less, thereby making it possible to provide rapid discharge response.

Figure 3:
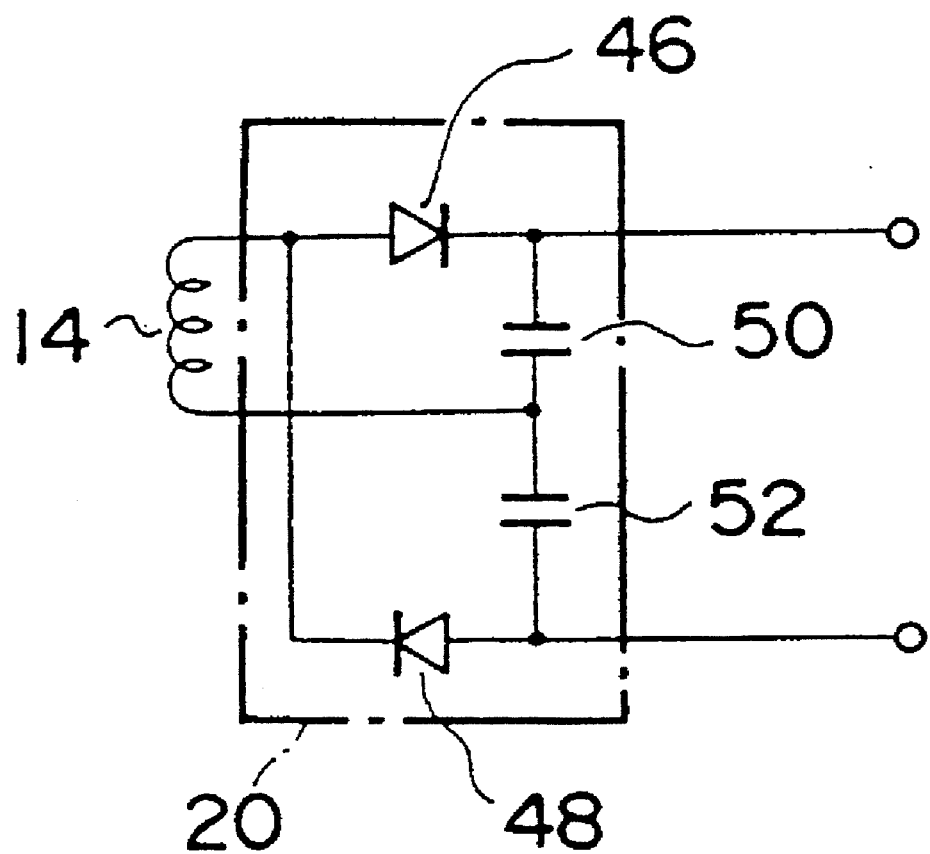
FIG. 3 is a circuit diagram showing another rectifier circuit employed in the first embodiment depicted in FIG. 1.
Figure 4:
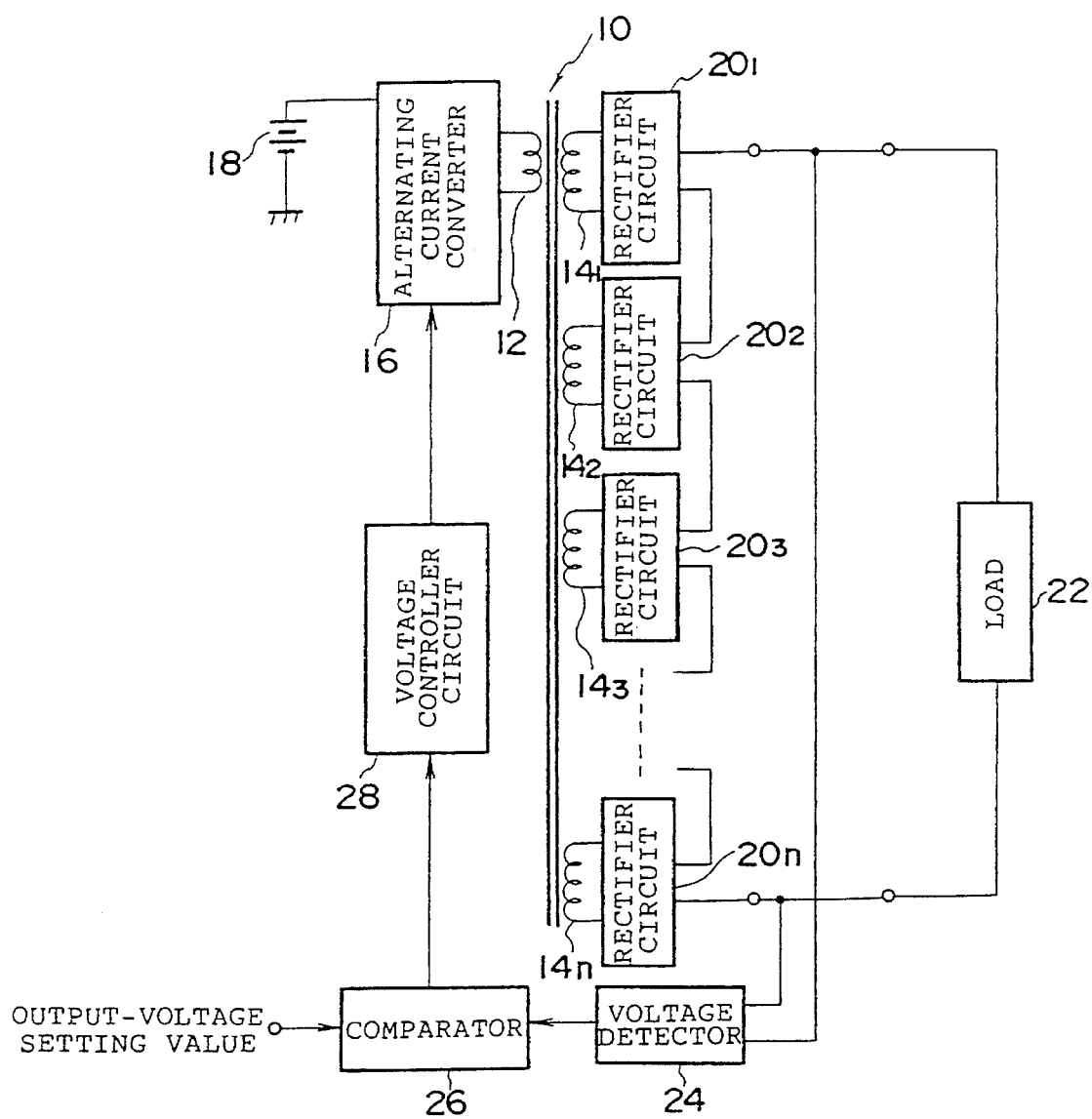
FIG. 4 is a block diagram illustrating a second embodiment of the present invention.

FIG. 3 shows another rectifier circuit 20 employed in the first embodiment of the present invention. The rectifier circuit 20 is comprised of a voltage doubler. The voltage doubler comprises two diodes 46, 48 and two capacitors 50, 52. The secondary winding 14 is electrically connected between a junction point, at which the capacitor 50 is electrically connected to the capacitor 52, and the anode of the diode 46. When the voltage doubler is activated, electric charges stored in the capacitors 50, 52 and the capacitive component 42 are discharged through the resistive component 44. Therefore, the total capacitance of both of the individual capacitors 50, 52 may be (K–C2×R)/R or less.

Figure 5:
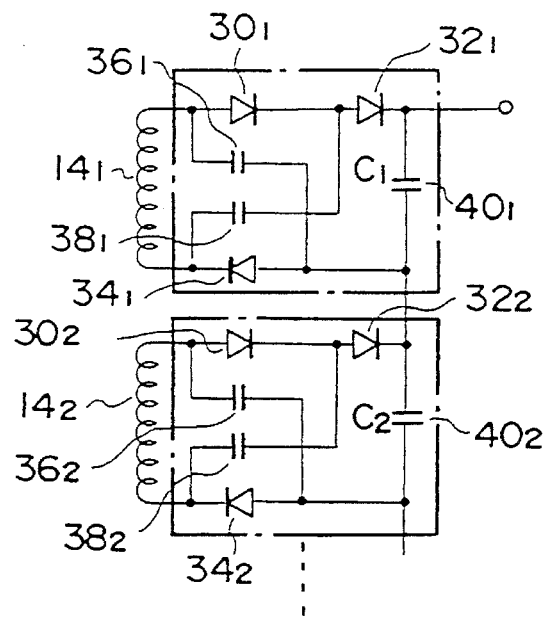
FIG. 5 is a circuit diagram depicting an array of rectifier circuits employed in the second embodiment.
Figure 6:
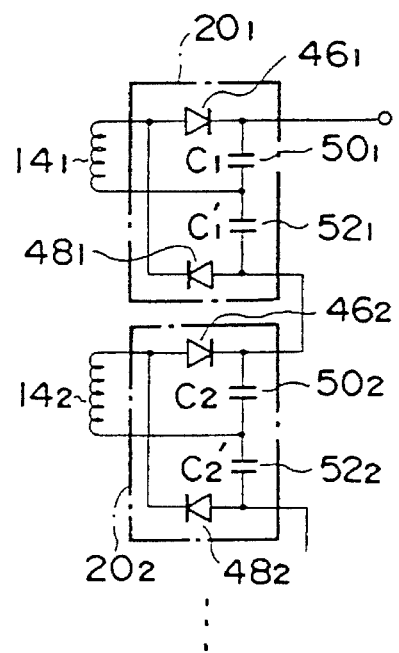
FIG. 6 is a circuit diagram showing another array of rectifier circuits employed in the second embodiment.

A second embodiment of the present invention will now be described below. The present embodiment is provided with a plurality of secondary windings and a plurality of rectifier circuits. Other elements of structure employed in the second embodiment are identical to those used in the first embodiment. Therefore, the same elements of structure as those employed in the first embodiment are identified by like reference numerals, and their description will therefore be omitted. The step-up transformer 10 employed in the present embodiment includes the single primary winding 12 and n secondary windings $14_1, 14_2, 14_3 \ldots 14_n$. Rectifier circuits $20_1, 20_2, 20_3 \ldots 20_n$ are electrically connected to the respectively corresponding secondary windings $14_1, 14_2, 14_3 \ldots 14_n$. One of the output terminals of the rectifier circuit $20_1$ is electrically connected to one of the two terminals of the capacitive load 22. The other output terminal of the rectifier circuit $20_1$ is electrically connected to one of the output terminals of the rectifier circuit $20_2$. The other terminal of the rectifier circuit $20_2$ is electrically connected to one of the output terminals of the rectifier circuit $20_3$, whose other terminal is electrically connected to one of the output terminals of the rectifier circuit $20_4$. Similarly, the remaining rectifier circuits are electrically connected to one another via their terminals. Thus, the rectifier circuits $20_1, 20_2, 20_3 \ldots 20_n$ are series-connected to one another. The other of the two output terminals of the rectifier circuit $20_n$ is electrically connected to the other terminal of the capacitive load 22. In addition, the voltage detector 24 is electrically connected between the one output terminal of the rectifier circuit $20_1$ and the other output terminal of the rectifier circuit $20_n$. The voltage triplet, which is shown in FIG. 2 and is employed in the first embodiment, can be used as each of the rectifier circuits employed in the present embodiment, as shown in FIG. 5. The voltage doubler, which is shown in FIG. 3 and is employed in the first embodiment, can be used as each of the rectifier circuits employed in the present embodiment, as shown in FIG. 6.

In the present embodiment, the n secondary windings, which have not been connected to each other, are electrically connected to the respectively corresponding rectifier circuits. The rectifier circuits are connected to each other in series. Accordingly, the voltage produced across both terminals of this series circuit is equal to the sum of voltages output from the individual rectifier circuits. If it is assumed that the outputs of the rectifier circuits are identical to one another, then a primary-to-secondary turn ratio may be set to 1/n to produce the primary-to-secondary voltage increase ratio, i.e., the ratio of increase in voltage, which is identical to that produced in the first embodiment. In addition, the ratio of a d.c. voltage having twice the peak a.c. input voltage to the a.c. input voltage, of the rectifier circuit, can also be reduced depending on the number of rectifier circuits to be used. Accordingly, each of the rectifier circuits can be comprised of diodes and capacitors which all have a low resistance to voltage. It is therefore possible to improve the response characteristic and operational efficiency of the power supply circuit. In addition, the power supply circuit can be manufactured at low cost and can be made small.

Since the ratio of increase in voltage can be raised by using electrical parts which have low resistance to voltage, the present embodiment can be applied to vehicle-applied devices using electrorheological fluid, which enables an increase in voltages, and in the highest voltage ranging from approximately 12 V to 10 KV at the highest voltage, and appropriately to about 6 KV. When the voltage tripler is used, capacitances $C_1, C_2, C_3 \ldots C_n$ of capacitors $40_1, 40_2, 40_3 \ldots 40_n$ may respectively be determined such as to satisfy the following expression:

$$\left( \frac{1}{\sum_{i=1}^{n} \frac{1}{Ci}} + C2 \right) \times R \leq K$$

When the respective capacitances are set equal to $C_c$, the above expression can be rewritten as follows:

$$\left( \frac{C_c}{2n} + C2 \right) \times R \leq K$$

In addition, capacitances $C_1, C_1', C_2, C_2', C_3, C_3' \ldots C_n, C_n'$ of capacitors $50_1, 52_1, 50_2, 52_2, \ldots 50_n, 52_n$ may respectively be determined in such a manner as to satisfy the following expression:

$$\left( \frac{1}{\sum_{i=1}^{n} \left( \frac{1}{Ci} + \frac{1}{Ci'} \right)} + C2 \right) \times R \leq K$$

When the respective capacitances are set equal to Co, the above expression can be rewritten as follows:

$$\left( \frac{Co}{2n} + C2 \right) \times R \leq K$$

Incidentally, each of the above embodiments describes a case in which the d.c. voltage is converted into a.c. voltage and the converted a.c. voltage is applied across the primary winding. However, the d.c. and a.c. voltages may be applied across the primary winding. Alternatively, a pulsating voltage may be applied to the terminals of the primary winding.

Figure 7:
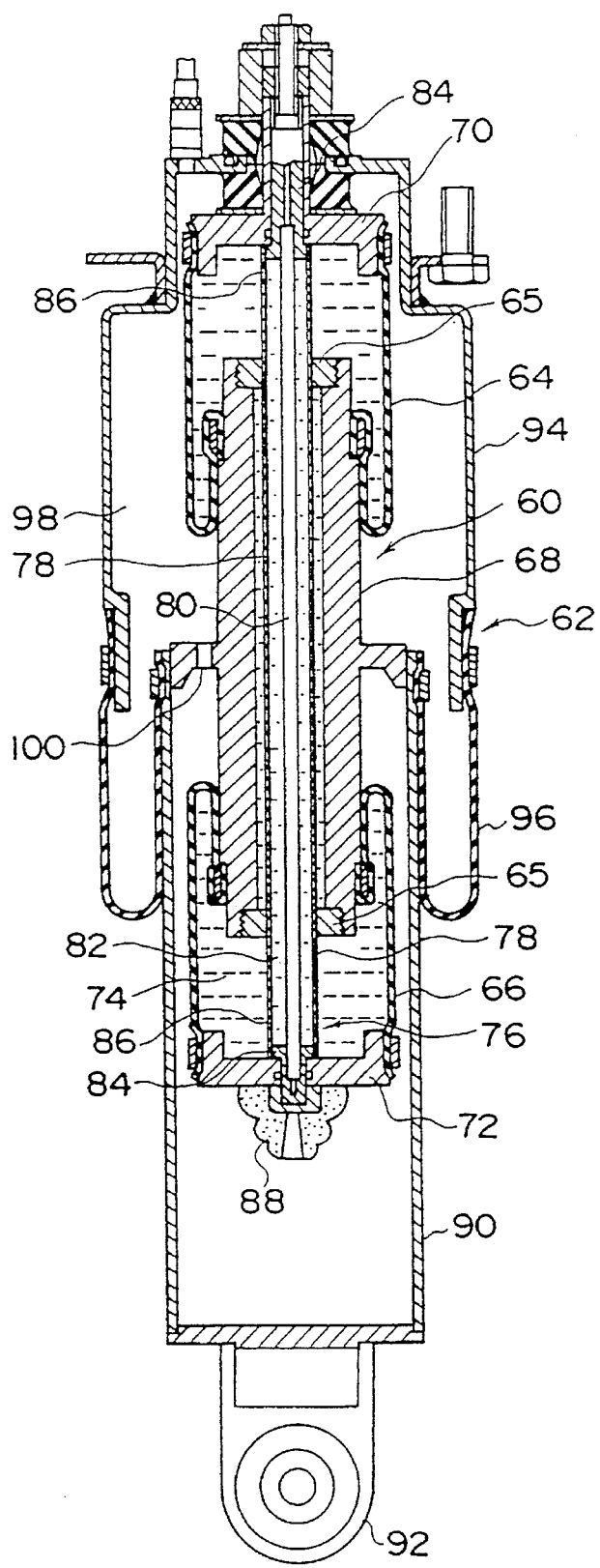
FIG. 7 is a cross-sectional view showing one example of a load employed in both of the first and second embodiments.

The capacitive load will now be described specifically by the following example with reference to FIG. 7.

This specific example is related to a vehicle suspension comprising a combination of a vibration damping apparatus 60 and an air spring 62. The vibration damping apparatus 60 has cylindrical, flexible diaphragms 64, 66. One end of a piston 68 is inserted into one end of the cylindrical, flexible member 64, and the other end of the piston 68 is inserted into one end of the cylindrical, flexible member 66 so as to be liquid-tight, i.e., so that liquid is prevented from leaking. The cylindrical, flexible diaphragms 64, 66 are connected to each other by the piston 68. The other ends of the cylindrical, flexible diaphragms 64, 66 are covered with a pair of metallic face plates 70, 72 respectively so as to be liquid-tight. Thus, liquid-tight chambers 74 are respectively defined in the cylindrical, flexible diaphragms 64, 66. The face plates 70, 72 are comprised of a positive electrode 80, which penetrates the face plates 70, 72, and a cylindrical negative electrode 78 with a restriction or diaphragm passage 82 defined between the positive electrode 80 and the negative electrode 78. The negative electrode 78 is comprised of two electrode members which are concentrically disposed with space therebetween. In addition, the face plates 70, 72 are connected to each other by a connecting member 76 which centrally extends through the piston 60 and is guided by guide members 65. A portion of the connecting member 76 which extends through the face plate 72 is covered with a stopper 88 formed of an elastic material. The positive electrode 80 and the negative electrode 78 are insulated from each other by an insulating material 84 interposed therebetween, which is formed of a synthetic resin, a ceramic or the like. In addition, the positive electrode 80 and each of the face plates 70, 72 are insulated from each other by the insulating material 84. Holes 86 are defined in positions near both ends of the negative electrode 78. The holes 86 allow the chambers 74 to communicate with the diaphragm passage 82. Electrorheological fluid is charged into the chambers 74 and the diaphragm passage 82.

A flange is formed on the outer peripheral wall of an intermediate portion of the piston 60. An inner cylindrical body 90, having a bottom, Is attached to the flange. An eye hook 92 for mounting the this apparatus on an attachment portion of a vehicle is mounted on the bottom of the inner cylindrical body 90.

One end of an outer cylindrical body 94 is mounted on the face plate 70. One end of a flexible sleeve 96 is hermetically mounted on the other end of the outer cylindrical body 94. The other end of the flexible sleeve 96 is hermetically fitted onto the outer peripheral wall of the inner cylindrical body 90. Accordingly, an air chamber 98 is formed by the inside of the outer cylindrical body 94 and the inside of the inner cylindrical body 90. The inside of the outer cylindrical body 94 and the inside of the inner cylindrical body 90 communicate with each other by a through hole 100 which extends through the flange. The air spring 62 is formed by filling the air chamber 98 with air.

The electrodes of the vibration damping apparatus 60, which has been constructed as described above, for a vehicle suspension are electrically connected to the above-mentioned power supply circuit. Since the voltage of a vehicle battery is 12 volts at this time, the output of the power supply circuit is set to appropriately about 6 KV, and about 10 KV at the highest voltage.

When an electric field does not exist in the space between the electrodes, the vibration damping apparatus 60 can exhibit a vibration damping function. On the other hand, when an electric field exists in the space between the electrodes, the viscosity of the electrorheological fluid increases in accordance with the strength of the produced electric field. Therefore, an intended vibration damping force can be produced by selecting the field strength.

In the vibration damping apparatus 60, the connecting member 76 may be disposed outside the chambers 74. However, it is preferable that the connecting member 76 be allowed to extend through the piston 60 and be disposed inside the chambers 74 so that the apparatus may be made more compactly. In this case, the sliding movement of the connecting member 76 along the piston 60 is guided by the guide members 65 respectively mounted on the upper and lower ends of the piston 60. Therefore, the connecting member 76 can slide smoothly along the piston 60. This guiding action is preferable in view of the fact that the connecting member 76 can be prevented from being held in abutment against the piston 60.

It is unnecessary to form liquid-tight seals between each of the guide members 65 and the connecting member 76. Each of the guide members 65 can be prevented from being closely fitted on the connecting member 76. Therefore, the connecting member 76 can be actuated by a slight driving force.

In the present embodiment, the diaphragm passage 82 in the connecting member 76 is defined in the form of a cylinder in order to create a desired cross section. However, the shape of the diaphragm passage 82 can be changed as needed to other shapes such as a barrel, a column having a suitable contour, etc.. The flowing of the electrorheological fluids stored in the diaphragms 64, 66 into the diaphragm passage 82 can be ensured by allowing the diaphragm passage 82 formed in this way to communicate with the insides of the diaphragms 64, 66 by means of the holes 86 defined in the ends of the connecting member 76.

According to the vibration damping apparatus constructed as described above, the length of the diaphragm passage 82 can be increased. Even if the cross section of the diaphragm passage 82 is reduced as needed, the components can completely be prevented from contacting with each other. Therefore, the vibration damping function of the vibration damping apparatus can be improved as expected without any inconveniences.

Having now fully described the invention, it will be apparent to those skilled in the art that many changes and modifications can be made without departing from the spirit or scope of the invention as set forth herein.

Figure 8:
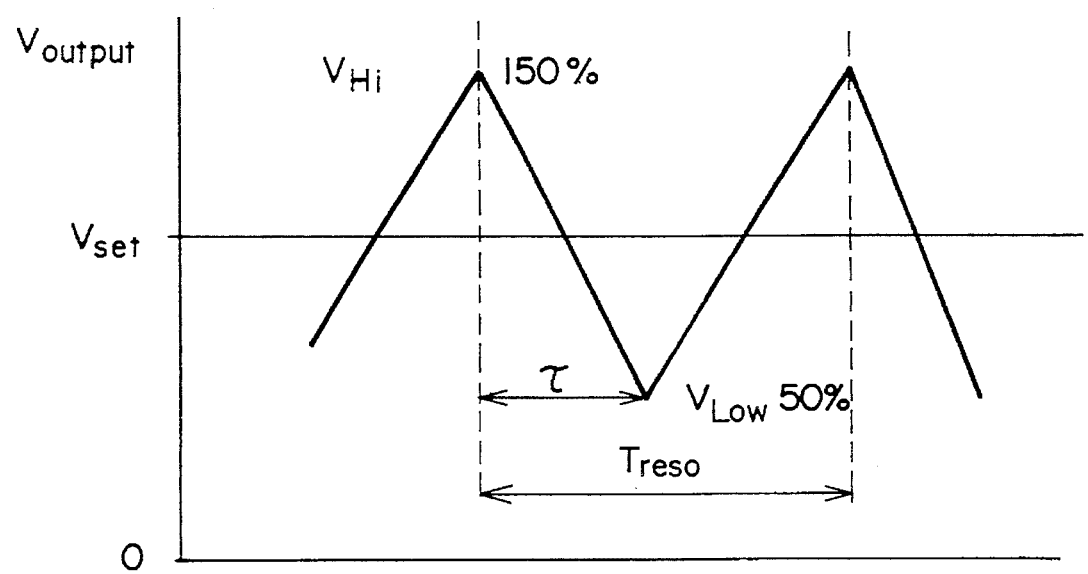
FIG. 8 is a graph showing an enlarged wave shape of a cycle of oscillation by the rectifier circuit electrically connected to a capacitive load applied to the present invention.
Figure 9:
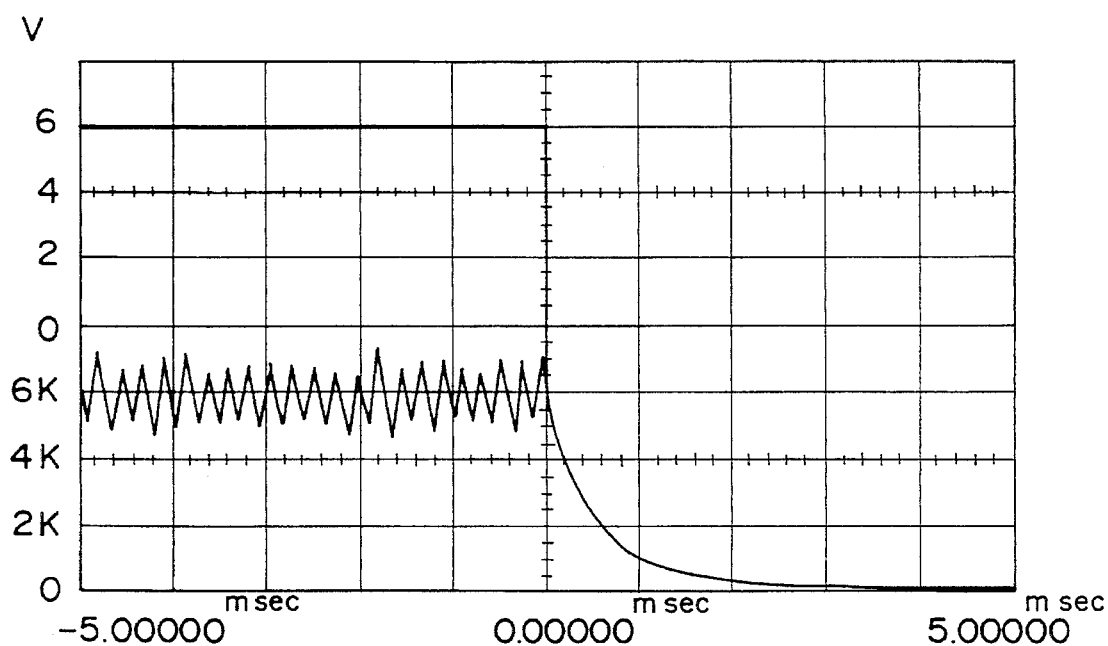
FIG. 9 is a graph showing cycles of oscillation of the rectifier circuit in FIG. 8.

FIGS. 8 and 9 show a relationship between the oscillation period, $T_{reso}$ of the electric power supply which is in the condition that the electric power supply is electrically connected to the capacitive load, and the output of the voltage of the voltage power supply.

The electrorheological fluid used in the vibration damping apparatus 22 of the present invention is has the capability for changing the viscosity is changed between approximately 1 msec to 3 msecs in response to cut-off of a voltage applied to the capacitive load without impairing the stability of an output voltage. On other words, in the present invention, it is provided the high voltage power supply having the period of time which is responsive to the period of time between approximately 1 msec to 3 msecs for changing the viscosity of the electrorheological fluid without any influence to control of the electrorheological fluid by oscillation of the electric power supply.

The group of particles of the electrorheological fluid is arranged in a certain order within the time of approximately 1 msec to 3 msecs when the voltage is applied thereto from the electric power supply. Moreover, the group of the particles which is orderly arranged becomes higher viscosity. In contrast, at the time of a cut-off of the voltage applied the electrorheological fluid, the group of the particles thereof is dispersed, and consequently the viscosity thereof becomes lower viscosity.

In a case that the period of time of oscillation of the electric power supply is expressed by a following expression, it is possible to obtain quick responsive characteristic of the electric power supply:

$$T_{reso} \leq 1/2 T_{ERF}$$

wherein $T_{ERF}$ represents the period of time for changing the viscosity of the electrorheological fluid, and $T_{reso}$ represents the period of oscillation of the electric power supply, With regard to the capacitance of the capacitor 40 disposed in the circuit shown in FIG. 2, an appropriate value of the capacitance thereof is determined so as to oscillate along a setting voltage of $V_{set}$ between the upper point of $V_{Hi}$ and the lower point of $V_{Low}$ of the oscillating wave shown in FIG. 8.

FIG. 8 shows of a cycle of oscillation of the capacitor 40, showing an enlarged wave shape of a cycle of oscillation in FIG. 9, by the electric power supply applied to the present invention. From results of measurement of the wave shapes of the oscillation of the capacitor 40 in condition of changing the capacitance $C_s$ of the capacitor 40, the capacitor oscillates at a value of 150% $\times V_{set}$ or under at a higher position of $V_{Hi}$, and at a value of 50% $\times V_{set}$ or above at a lower position of $V_{Low}$.

It is known that the electric discharge characteristic becomes ⅓ of an initial value at a discharge time constant τ when a capacitor is assembled in a circuit. The upper limit of the electric discharge characteristic is τ. FIG. 8 shows τ. Namely, the value of the oscillation from the $V_{Hi}$ to $V_{Low}$ is reduced about 30% in the period of τ. $T_{reso}$ represents an oscillating period of the electric power supply which is in the condition that the electric power supply is electrically connected to the capacitive load in the graph of FIG. 8. Consequently, it is found that the relationship is understood by the expression of $$T_{reso} \leq 2\tau$$

The value of $T_{reso}$ is obtained as disclosed above. In order to satisfy the condition which is shown by the following expression:

$$T_{reso} \leq \tfrac{1}{2} T_{ERF}$$

the condition is obtained by the following express:

$$2\tau \geq T_{reso} \leq \tfrac{1}{2} T_{ERF}$$

therefore, the value of $2\tau = \tfrac{1}{2} T_{ERF}$ is obtained.
Accordingly, it is possible to satisfy the condition of $$T_{reso} \leq \tfrac{1}{2} T_{ERF}$$

Now, the value of the actual capacitance is calculated in accordance with the embodiment of the present invention as follows:

$T_{ERF}$ which represents the time of velocity of changing the viscosity of the electrorheological fluid is approximately 1 to 3 msecs. Accordingly, it is obtained the following expression:

$$.25 \leq \tau \leq 0.75 \text{ msec.}$$

Here, the electric discharge time constant of the output portion which includes the capacitive load of the electrorheological fluid is τ which is calculated as $$\tau = (C_s + C_{ERF}) R_{ERF}$$

accordingly, $0.25 \text{ msec} \leq (C_s + C_{ERF})R_{ERF} \leq 0.75 \text{ msec}$.

In the embodiment of the present invention, the electrorheological fluid has the following characteristics of:

$$R_{ERF}: 1M\Omega \text{ to } 5M\Omega, \text{ and } C_{ERF}: 50 \text{ pF to } 250 \text{ pF}$$

Accordingly, it is obtained a following expression of:

$$.1 \text{ m} \leq C_{ERF} \times R_{ERF} \leq 0.5 \text{ m, and}$$

then $0.15 \text{ m} \leq C_s \times R_{ERF} \leq 0.25 \text{ nF}$.

The resistance value of $R_{ERF}$ of the electrorheological fluid is between 1M Ω to 5M Ω.

Therefore, it is obtained a following expression of:

$$.03 \text{ nF} \leq .15 \text{ nF} \leq C_s \leq 0.05 \text{ nF} \leq .25 \text{ nF}$$

When the capacitor which has the capacitance represented by the expression of $30 \text{ pF} \leq C_s \leq 250 \text{ pF}$ is used to the present invention, the electric power supply for the electrorheological fluid damping system, which satisfies the condition expressed by the following expression of:

$$T_{reso} \leq \tfrac{1}{2} T_{ERF} \text{ is obtained}$$

What is claimed is:
1. An electrorheological fluid damping control system having a high voltage power supply comprising:
 a vibration damping apparatus having an air chamber and first and second flexible fluid chambers, said first and second flexible fluid chambers being communicated with at least one passage provided between said first and second flexible fluid chambers;
 a negative electrode and a positive electrode being separately disposed in said vibration damping apparatus through said first and second flexible fluid chambers;
 a capacitive load including electrorheological fluid having a capability for changing viscosity thereof between approximately 1 to 3 msecs, and being charged in said first and second flexible fluid chambers and said passage, and said negative electrode and said positive electrode being exposed to said electrorheological fluid;
 a transformer having a primary winding connected to an alternating current converter, and a secondary winding;
 a feedback control circuit for detecting a voltage across output terminals of a rectifier circuit and for producing a voltage control signal for controlling an alternating current source; and
 The rectifier circuit electrically connected to said secondary winding of said transformer and having a capacitor electrically connected to said negative electrode and said positive electrode, said capacitor having a characteristic of periodically oscillating under an expression of

$$T_{reso} \leq \tfrac{1}{2} T_{ERF}$$

wherein $T_{reso}$ represents a oscillating period of said power supply which is in the condition that said power supply is electrically connected to the capacitive load, and $T_{ERF}$ represents a period of time for changing the viscosity of the electrorheological fluid, and wherein said capacitive load is connected to the output terminals of said rectifier circuit, electric charges stored in said capacitor and in a capacitive component of said capacitive load are discharged through a resistive component of said capacitive load when an application of a voltage to said capacitive load is cut off, and an electrostatic capacitance of said capacitor is determined such that a discharge time constant τ of a circuit comprising said capacitor and said capacitive load is predetermined, in order to produce high-speed response of the power supply circuit when the supply of the voltage to the capacitive load is cut off, under the formula of $$T_{reso} \leq 2\tau$$

2. An electrorheological fluid damping control system according to claim 1, wherein said negative electrode and said positive electrode have respectively electrode area between approximately 100 to 500 cm², and have a distance approximately between 2 and 8 mm therebetween.

3. An electrorheological fluid damping control system according to claim 1, wherein $T_{reso}$ is approximately between 30 to 250 PF.

4. An electrorheological fluid damping control system according to claim 1, wherein said discharge time constant τ is obtained under an expression of $$\tau = (C_s + C_{ERF}) \times R_{ERF}$$

wherein $C_s$ represents the capacitance of said capacitor, $C_{ERF}$ represents an the capacitance of said capacitive component, and $R_{ERF}$ represents a value of resistance of said electrorheological fluid.

5. An electrorheological fluid damping control system according to claim 1, wherein said primary winding of said transformer is electrically connected to a direct current power supply through said alternating current converter.

6. An electrorheological fluid damping control system according to claim 1, wherein said capacitor is a smoothing capacitor, and is electrically parallel-connected to said capacitive load.

7. An electrorheological fluid damping control system according to claim 1, wherein said rectifier circuit includes a plurality of diodes and a plurality of capacitors including a capacitor electrically parallel-connected to said capacitive load.

8. An electrorheological fluid damping control system according to claim 1, wherein said rectifier circuit comprises:
   a first diode whose anode is electrically connected to one end of said secondary winding of said transformer;
   a second diode whose anode is electrically connected to a cathode of said first diode and whose cathode is electrically connected to one end of said capacitive load;
   a third diode whose cathode is electrically connected to the other end of said secondary winding and whose anode is electrically connected to the other end of said capacitive load;
   a first capacitor having one end electrically connected to the one end of said secondary winding, and the other end electrically connected to the anode of said third diode; and
   a second capacitor having one end electrically connected to the other end of said secondary winding, and the other end electrically connected to the cathode of said first diode; and
   wherein said capacitor is a third capacitor having one end electrically connected to the cathode of said second diode, and the other end electrically connected to the anode of said third diode.

9. An electrorheological fluid damping control system according to claim 1, wherein said rectifier circuit includes a plurality of diodes and a plurality of electrically series-connected capacitors electrically parallel-connected to said capacitive load.

10. An electrorheological fluid damping control system according to claim 1, wherein said rectifier circuit comprises:
   a first diode whose anode is electrically connected to one end of said secondary winding and whose cathode is electrically connected to one end of said capacitive load;
   a second diode whose cathode is electrically connected to the one end of said secondary winding and whose anode is electrically connected to the other end of said capacitive load; and
   two capacitors electrically series-connected to each other, said two capacitors having one end electrically connected to the cathode of said first diode, the other end electrically connected to the anode of said second diode and a junction point between said two capacitors, which is electrically connected to the other end of said secondary winding.

11. An electrorheological fluid damping control system according to claim 1, wherein said capacitive load is an electrorheological fluid applied apparatus using electrorheological fluid.

12. An electrorheological fluid damping control system having a high voltage power supply and power supply circuit comprising:
   a vibration damping apparatus having an air chamber and first and second flexible fluid chambers, said first and second flexible fluid chambers being communicated with at least one passage provided between said first and second flexible fluid chambers;
   a negative electrode and a positive electrode being separately disposed in said vibration damping apparatus through said first and second flexible fluid chambers;
   a capacitive load including electrorheological fluid having a capability for changing viscosity thereof between approximately 1 to 3 msecs, and being charged in said first and second flexible fluid chambers and said passage, and said negative electrode and said positive electrode being exposed to said electrorheological fluid;
   a transformer having a primary winding and a plurality of secondary windings electrically mutually unconnected to one another;
   a plurality of rectifier circuits, each of said plurality of rectifier circuit electrically connected to corresponding one of the secondary windings of said transformer and having a capacitor, and the capacitors of said plurality of rectifier circuits being mutually series-connected, wherein a capacitive load is connected to output terminals of a combination of said plurality of rectifier circuits, electric charges stored in said plurality of capacitors and in a capacitive component of said capacitive load are discharged through a resistive component of said capacitive load when an application of a voltage to said capacitive load is cut off;
   a feedback control circuit for detecting a voltage across output terminals of the rectifier circuits and for producing a voltage control signal for controlling an alternating current convertor; and each said capacitor having a characteristic of periodically oscillating under an expression of $$T_{reso} \leq \tfrac{1}{2} T_{ERF}$$

wherein $T_{reso}$ represents a oscillating period of said power supply which is in the condition that said power supply is electrically connected to the capacitive load, and $T_{ERF}$ represents a period of time for changing the viscosity of the electrorheological fluid, and, said an electrostatic capacitance of said capacitors is determined such that a discharge time constant $\tau$ of a circuit comprising said capacitors and said capacitive load is predetermined, in order to produce high-speed response of the power supply circuit when the supply of the voltage to the capacitive load is cut off, under the formula of $$T_{reso} \leq 2\tau$$

13. An electrorheological fluid damping control system according to claim 12, wherein the primary winding of said transformer is electrically connected to a direct current power supply through said alternating current converter.

14. An electrorheological fluid damping control system according to claim 12, wherein said plurality of capacitors is electrically parallel-connected to said capacitive load.

15. An electrorheological fluid damping control system according to claim 12, wherein each of said rectifier circuits has a plurality of diodes and a plurality of capacitors including a capacitor electrically series-connected to a capacitor of an adjacent rectifier circuit.

16. An electrorhcological fluid damping control system according to claim 12, wherein each of said rectifier circuits comprises:

a first diode whose anode is electrically connected to one end of one of said plurality of secondary windings;

a second diode whose anode is electrically connected to a cathode of said first diode and whose cathode is electrically connected to one end of said capacitive load;

a third diode whose cathode is electrically connected to the other end of said one of said plurality of secondary windings and whose anode is electrically connected to the other end of said capacitive load;

a first capacitor having one end electrically connected to the one end of said one of said plurality of secondary windings, and the other end electrically connected to the anode of said third and diode;

a second capacitor having one end electrically connected to the other end of said one of said plurality of secondary windings, and the other end electrically connected to the cathode of said first diode; and wherein said capacitor is a third capacitor having one end electrically connected to the anode of said second diode, and the other end electrically connected to the cathode of said third diode, said third capacitor being electrically series-connected to a capacitor of an adjacent rectifier circuit.

17. An electrorheological fluid damping control system according to claim 12, wherein each of said rectifier circuits includes a plurality of diodes and a plurality of series-connected capacitors electrically series-connected to a capacitor of an adjacent rectifier circuit.

18. An electrorheological fluid damping control system according to claim 12, wherein each of said rectifier circuits comprises:

a first diode whose anode is electrically connected to one end of one of said plurality of secondary windings and whose cathode is electrically connected to one end of said capacitive load;

a second diode whose cathode is electrically connected to the one end of said one of said plurality of secondary windings and whose anode is electrically connected to the other end of said capacitive load; and two capacitors electrically series-connected to each other, said two capacitors having one end electrically connected to the cathode of said first diode, the other end electrically connected to the anode of said second diode, and a junction point between said two capacitors, which is electrically connected to the other end of said one of said plurality of secondary windings, said two capacitors being electrically series-connected to a capacitor of an adjacent rectifier circuit.

19. An electrorheological fluid damping control system according to claim 12, wherein said capacitive load is an applied electrorheological fluid apparatus using electrorheological fluid.

20. An electrorheological fluid damping control system according to claim 12, wherein said capacitors are smoothing capacitor.

* * * * *